(12) United States Patent
Hotta et al.

(10) Patent No.: US 7,796,817 B2
(45) Date of Patent: Sep. 14, 2010

(54) CHARACTER RECOGNITION METHOD, CHARACTER RECOGNITION DEVICE, AND COMPUTER PRODUCT

(75) Inventors: Yoshinobu Hotta, Kawasaki (JP); Katsuhito Fujimoto, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 912 days.

(21) Appl. No.: 11/654,180

(22) Filed: Jan. 16, 2007

(65) Prior Publication Data
US 2008/0069447 A1   Mar. 20, 2008

(30) Foreign Application Priority Data
Sep. 14, 2006   (JP)   ............... 2006-249833

(51) Int. Cl.
*G06K 9/00*   (2006.01)
*G06K 9/18*   (2006.01)

(52) U.S. Cl. ....................... 382/181; 382/182

(58) Field of Classification Search ............... 382/181, 382/182, 209, 218, 229, 284
See application file for complete search history.

(56) References Cited

U.S. PATENT DOCUMENTS

| | | | | |
|---|---|---|---|---|
| 4,633,502 A | * | 12/1986 | Namba | 382/177 |
| 4,741,045 A | * | 4/1988 | Denning | 382/178 |
| 5,889,887 A | * | 3/1999 | Yabuki et al. | 382/178 |
| 7,551,779 B2 | * | 6/2009 | Garside et al. | 382/186 |

FOREIGN PATENT DOCUMENTS

| | | |
|---|---|---|
| JP | 9-305707 | 11/1997 |
| JP | 10-307892 | 11/1998 |
| JP | 2871590 | 1/1999 |
| JP | 3455649 | 7/2003 |

* cited by examiner

*Primary Examiner*—Daniel G Mariam
(74) *Attorney, Agent, or Firm*—Greer, Burns & Crain, Ltd.

(57) ABSTRACT

Upon receiving, for example, document data including a character string from outside, a character recognition device detects a line from a line-touching character-string image in which at least one character (such as number, alphabet letter, kana character, and Chinese character) touches (or overlaps) a line in the document data, tentatively removes the line, and estimates a character region. The character recognition device extracts a line-touching character image from the line-touching character-string image (original image) based on the estimated character region. The character recognition device creates a line-added reference character image by adding a quasi-line to a reference character image stored in advance.

15 Claims, 12 Drawing Sheets

FIG.3
(WHEN CHARACTER STRING TOUCHES LINE)
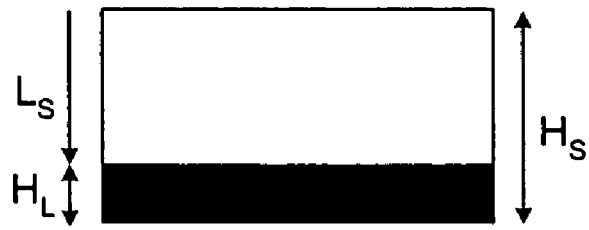
(WHEN LINE RUNS ACROSS CHARACTER STRING)
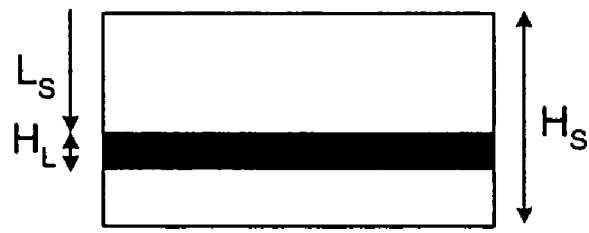
(POSITION OF LINE: $L_S$, WIDTH OF LINE: $H_L$, HEIGHT OF CHARACTER STRING: $H_L$)

(1) UNEVEN LINE-TOUCHING CHARACTER STRING IMAGE (THERE IS VARIATION IN HEIGHT OF CHARACTERS)

(2) DETECT LINE BY DIVIDING IMAGE INTO PARTIAL CHARACTER STRING UNITS (3) CHARACTER STRING IMAGE AFTER LINE REMOVAL

AVERAGE CHARACTER IMAGE

(CHARACTER SUCCESSFULLY COMPENSATED)

2 → ? → ?

(CHARACTER DIFFICULT TO BE COMPENSATED)

CHARACTER RECOGNITION METHOD, CHARACTER RECOGNITION DEVICE, AND COMPUTER PRODUCT

BACKGROUND OF THE INVENTION

1. Field of the Invention

The present invention relates to a technology for recognizing a character overlapped with a pattern.

2. Description of the Related Art

In an electronic document such as a spreadsheet or checklist, a letter or character image sometimes overlaps or touches a line in the electronic document. In such a case, it is necessary to recognize the character image, and for example, Japanese Patent No. 2871590 discloses a technology for this purpose. In general, character recognition is performed in the electronic document by removing a line from a character image in which one or more characters overlap or touch the line, and compensating the removed portion.

With the conventional technology, however, it is difficult to compensate the removed portion because there are various manners in which a character image touches a line, and also a character image includes not only an image of alphabet letters and numbers that have simple shapes but also characters that have complicated shapes such as Chinese characters (see FIG. 15, for example).

For this reason, for example, Japanese Patent No. 3455649 discloses a technology for recognizing a character image in a document. According to the conventional technology, features of a line-touching character image is stored as a dictionary in advance, and character recognition is performed based on the dictionary without removing a line from the line-touching character image.

In the conventional technology, however, where a character image is recognized without removing a line from a line-touching character image, a large memory capacity is required for the dictionary. Specifically, information stored as the dictionary includes types of lines, such as a bold line, a thin line, a broken line and a dashed-dotted line, and possible crossing positions of a line and a character image, such as the top, bottom, left, right and inside of the character, which increases the size of the dictionary to be stored.

SUMMARY OF THE INVENTION

It is an object of the present invention to at least partially solve the problems in the conventional technology.

According to an aspect of the present invention, a character recognition device that recognizes an overlapping character which is overlapped with a pattern, includes an estimating unit that estimates, when a character string that includes an overlapping character is input from outside, a position of a pattern in an image of the overlapping character, an extracting unit that removes the pattern from the overlapping character image based on estimated position of the pattern, specifies a character region in the overlapping character image from which the pattern has been removed, and extracts a region corresponding to specified character region from the overlapping character image before removal of the pattern as a target region to be subjected to character recognition, a creating unit that creates a reference image to be compared with the overlapping character image by adding an image of the pattern to a character image stored in advance based on the estimated position, and a recognizing unit that recognizes the overlapping character by comparing a feature of an image in the target region with a feature of the reference image.

According to another aspect of the present invention, a character recognition method for recognizing an overlapping character which is overlapped with a pattern, includes estimating, when a character string that includes an overlapping character is input from outside, a position of a pattern in an image of the overlapping character, removing the pattern from the overlapping character image based on estimated position of the pattern, specifying a character region in the overlapping character image from which the pattern has been removed, extracting a region corresponding to specified character region from the overlapping character image before removal of the pattern as a target region to be subjected to character recognition, creating a reference image to be compared with the overlapping character image by adding an image of the pattern to a character image stored in advance based on the estimated position, and recognizing the overlapping character by comparing a feature of an image in the target region with a feature of the reference image.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic for explaining the position of a line, the height of a character string, and the width of the line according to the first embodiment;

FIG. 15 is a schematic for explaining a conventional technology.

DETAILED DESCRIPTION OF THE PREFERRED EMBODIMENTS

Exemplary embodiments of the present invention are explained in detail below with reference to the attached drawings. In the embodiments described below, character recognition is performed to recognize letters or characters in an electronic document as an example.

Figure 1:
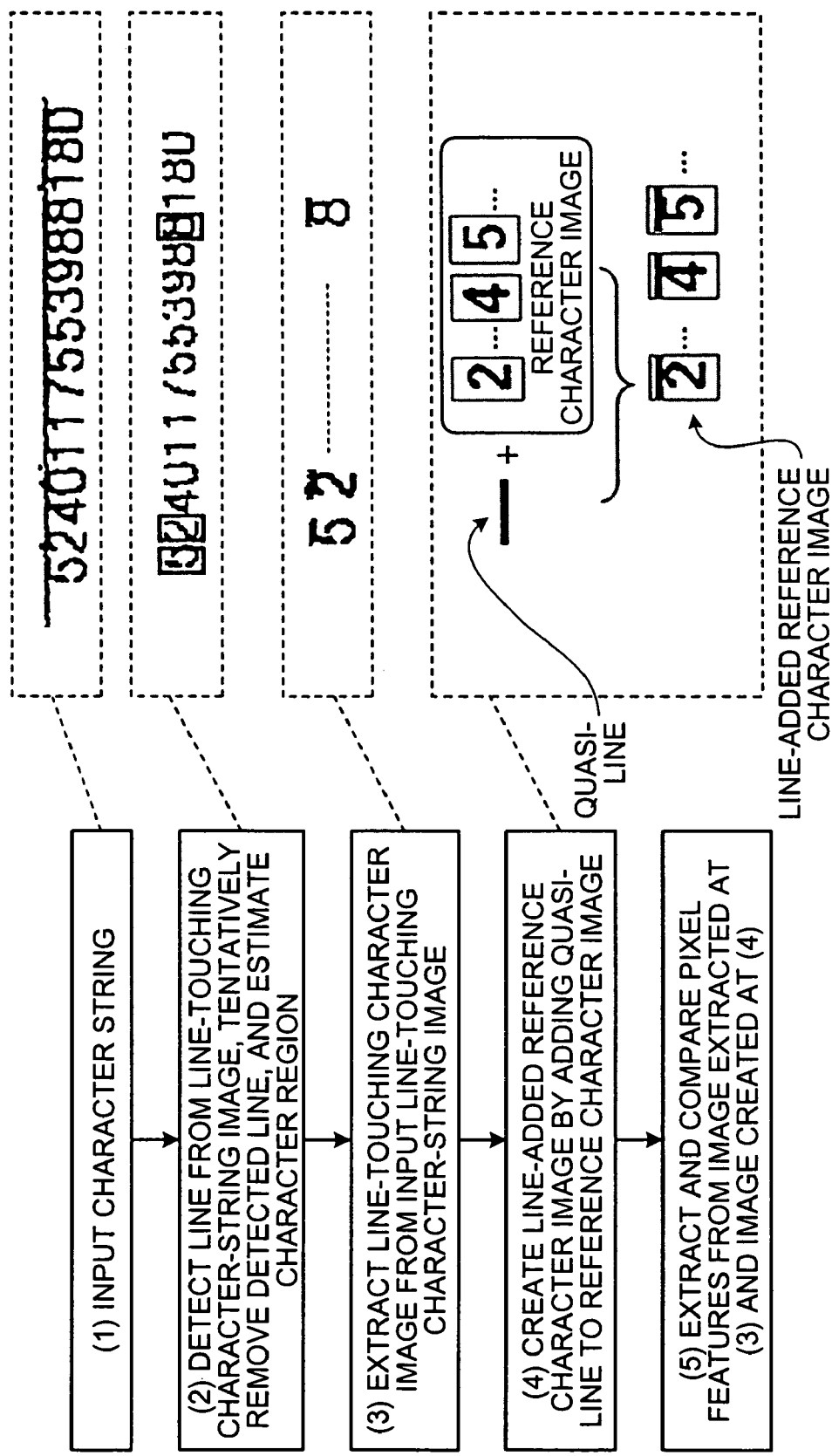
FIG. 1 is a schematic for explaining the overview and characteristic features of a character recognition device according to a first embodiment of the present invention.

FIG. 1 is a schematic for explaining the overview and characteristic features of a character recognition device 10 according to a first embodiment of the present invention.

In summery, the character recognition device 10 recognizes a character from a character-string image (overlapping character image) in which at least one letter, a character, a number, etc. overlaps or touches a line (hereinafter, "line-touching character-string image"). Each time a character string is input from outside, information on the features of line-touching characters is dynamically generated. Thus, it is possible to accurately recognize characters that constitute a line-touching character image without requiring a large memory capacity for a dictionary to store the features of various line-touching characters in consideration of crossing positions of lines and characters.

This main characteristic feature is more specifically explained. When, for example, document data containing a character string is input from outside (see (1) of FIG. 1), the character recognition device 10 detects a line from a line-touching character-string image in which characters (such as numbers, alphabet letters, kana characters, and Chinese characters) touch (or overlap) the line. The detected line is tentatively removed to estimate a character region (see (2) of FIG. 1).

Figure 2:
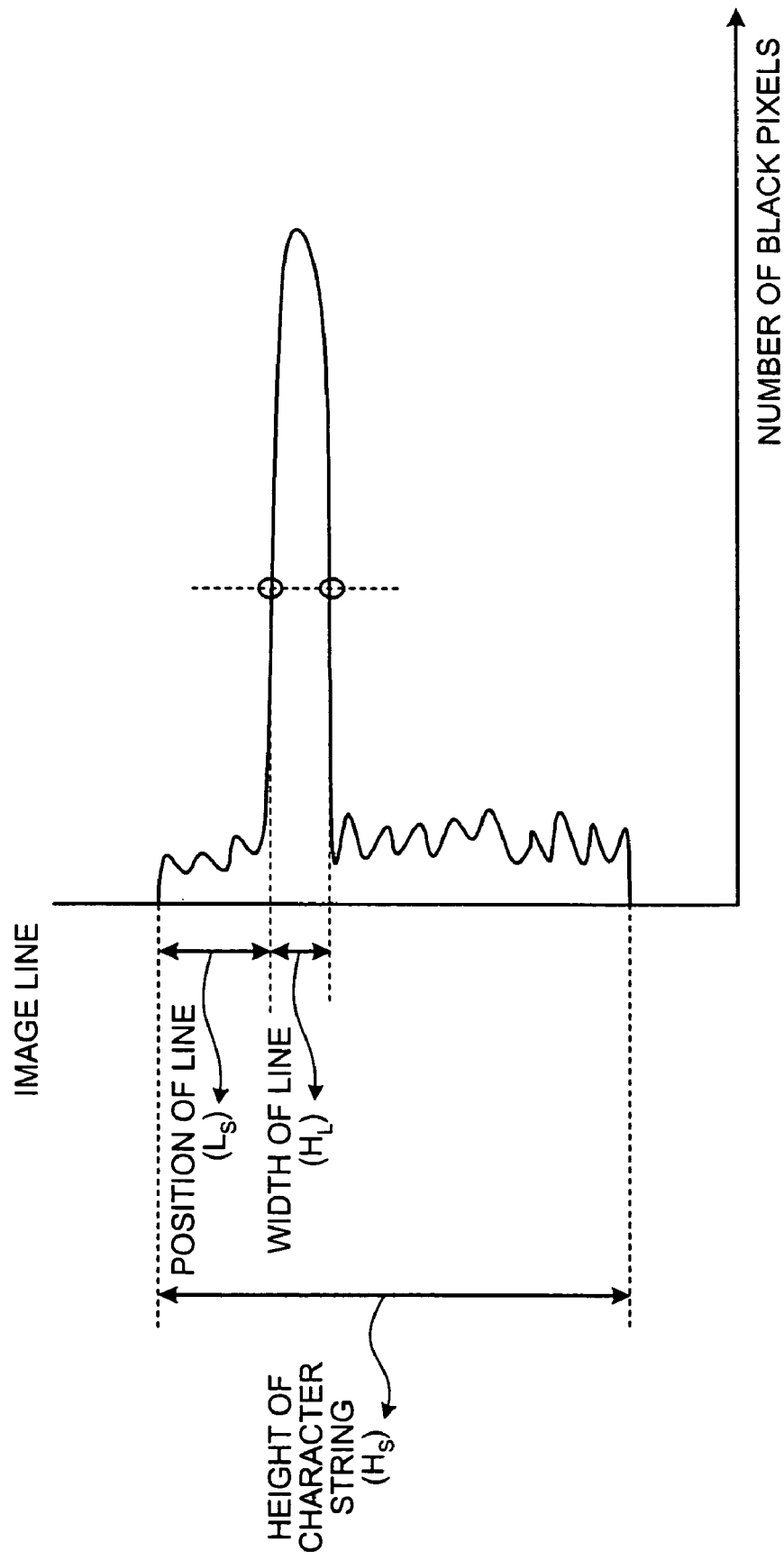
FIG. 2 is a black pixel histogram according to the first embodiment.

More specifically, the character recognition device 10 projects a black pixel histogram onto the input document data as shown in FIGS. 2 and 3. As a result, the position of the line ($L_S$) and the width of the line ($H_L$) are detected based on the peak of the black pixel count. In addition, the height of the character string ($H_S$) is detected based on the boundary between black pixel levels. Next, the line is tentatively removed from the line-touching character-string image based on the detected position and width of the line. Thereafter, a character region is putatively defined by applying the detected height of the character string to each of the characters in the character string image where the character string is individually divided (i.e., where the characters linked together with a line are separated into individual ones by removing the line).

Figure 4:
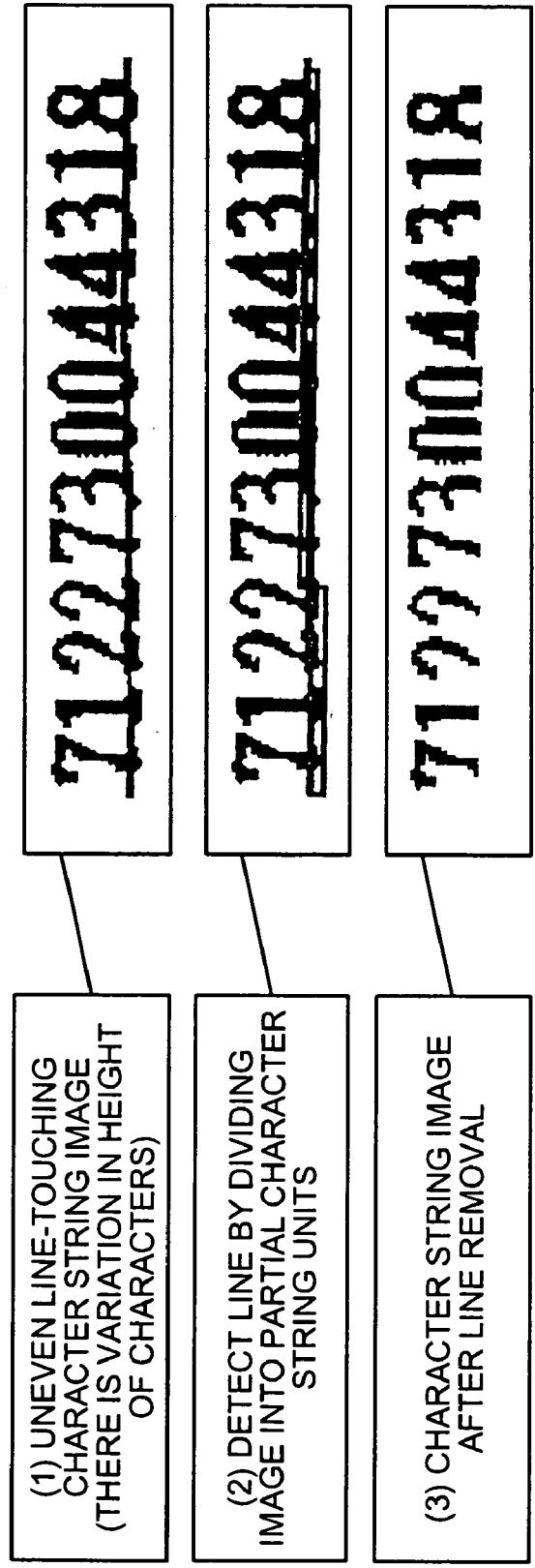
FIG. 4 is a schematic for explaining an example of line detection and removal according to the first embodiment.

If, as shown in FIG. 4, the input line-touching character-string image does not have a uniform height (see (1) of FIG. 4), the line can be detected through the black pixel histogram after the image is divided into partial character string units (see (2) of FIG. 4). Then, the line is tentatively removed (see (3) of FIG. 4). This is because the black pixel histogram does not exhibit a clear peak when the height of the character string is not uniform.

Figure 5:
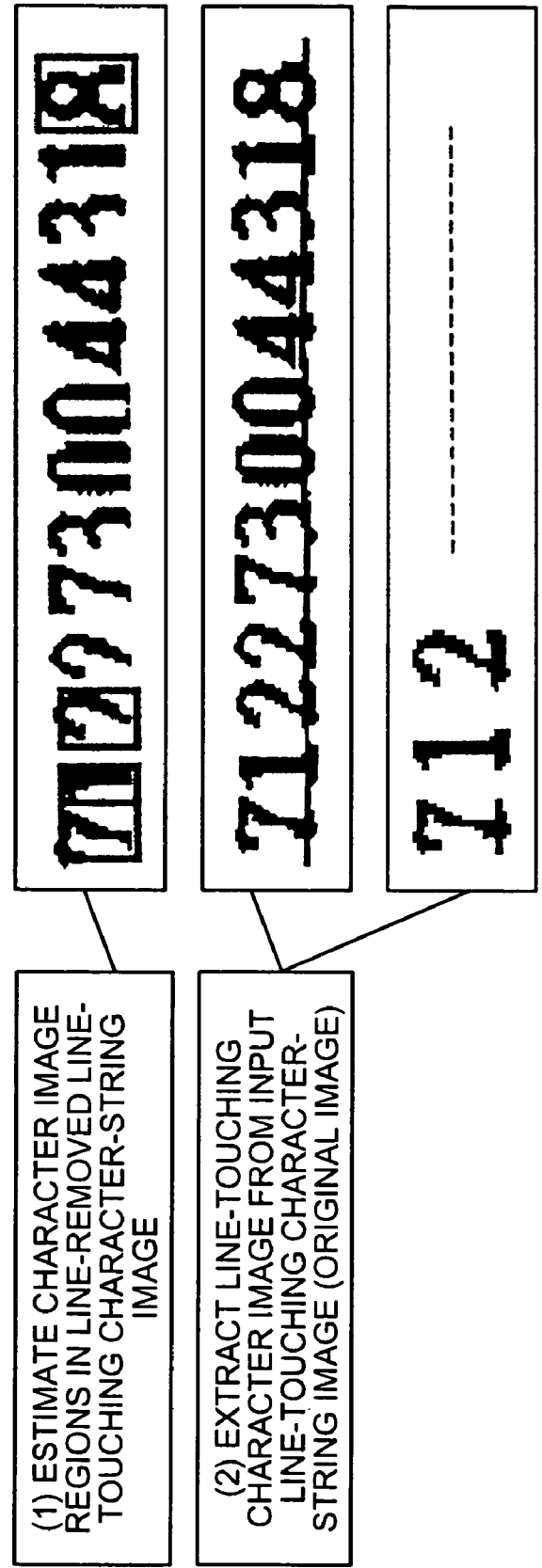
FIG. 5 is a schematic for explaining an example of extraction of a character image overlapped with a line according to the first embodiment.

After the estimation of the character region, the character recognition device 10, as shown in FIG. 5, uses the estimated character region (see (1) of FIG. 5) to extract a line-touching character image from the input line-touching character-string image (original image) (see (2) of FIG. 5 and (3) of FIG. 1).

Figure 6:
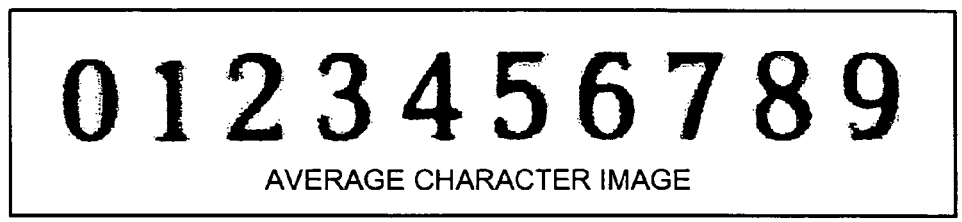
FIG. 6 is an example of an average character image adopted as a reference character image according to the first embodiment.

After the extraction of the line-touching character image, the character recognition device 10 adds a quasi-line to a stored reference character image to create a line-added reference character image (see (4) of FIG. 1). More specifically, the character recognition device 10 creates a line-added reference character image by adding a quasi-line to a stored reference image based on the detected position and width of the line. The character recognition device 10 can store, as reference character images, average character images that are created by using a large number of images of existing fonts, as shown in FIG. 6.

After the line-added reference character image is created, the character recognition device 10 extracts pixel features from the line-touching character image extracted from the line-touching character-string image (original image) and also from the created line-added reference character image, and compares the extracted pixel features (see (5) of FIG. 1). More specifically, the density pattern of pixels that constitute the line-touching character image is compared with the density pattern of pixels that constitute the line-added reference character image. When a predetermined degree of collation is achieved, the character included in the line-touching character image is recognized as the character (e.g., a number "5") included in the created line-added reference character image (e.g., a line-added reference character image in which the number "5" and a line are combined).

As described above as the main characteristic feature, the character recognition device 10 dynamically generates features of line-touching characters each time a character string is input from outside. Thus, the character recognition device recognizes characters of the line-touching character string with high accuracy without requiring a large dictionary capacity for storing features of various line-touching characters when various possible line-character crossing positions are taken into account.

Figure 7:
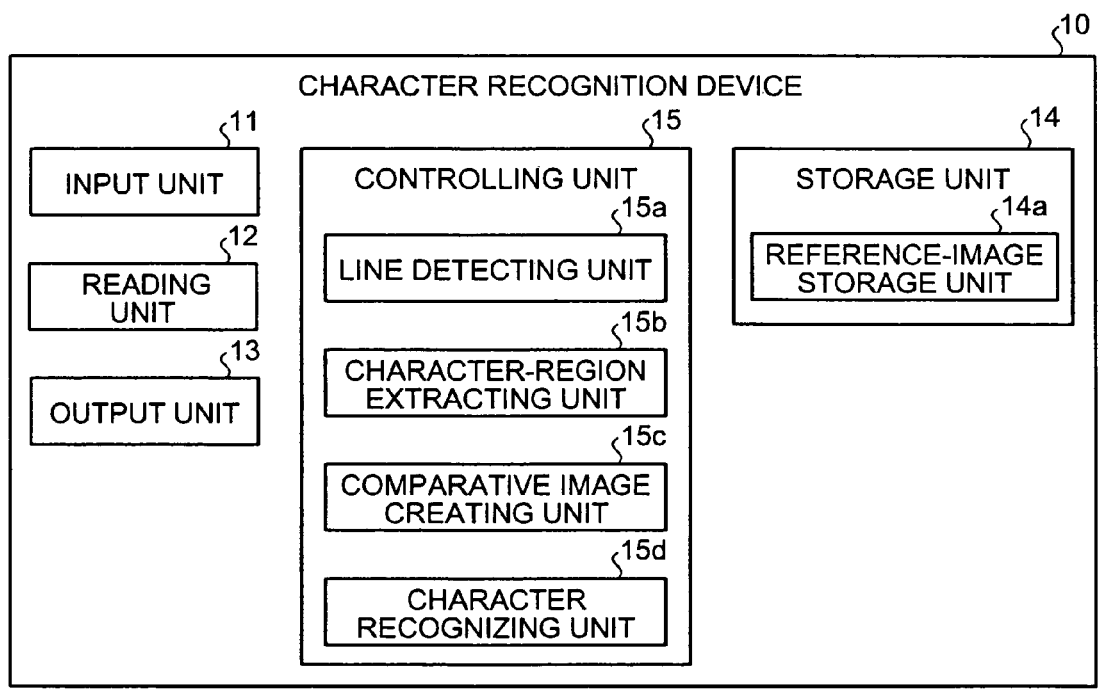
FIG. 7 is a block diagram of the character recognition device.

FIG. 7 is a block diagram of the character recognition device 10. In FIG. 7, to simplify the drawings, only components necessary to understanding the invention are shown, and others are omitted.

The character recognition device 10 includes an input unit 11, a reading unit 12, an output unit 13, a storage unit 14, and a controlling unit 15.

The input unit 11 receives various types of input information. The input unit 11 includes a keyboard, a mouse, a microphone, and the like. Information is input when designation of data for an electronic form is received from an operator of the character recognition device, for example. The monitor described below also serves as a pointing device, together with a mouse.

The reading unit 12 reads various types of data. The reading unit 12 reads document data that includes a character string (such as numbers, alphabet letters, kana characters, and Chinese characters) inserted into a form and outputs it to the controlling unit 15.

The output unit 13 outputs various types of information, and includes a monitor (or a display or a touch panel) and a speaker. The output unit 13 outputs and displays, for example, character recognition results obtained by a character recognizing unit 15d, described later.

The storage unit 14 stores therein data and programs necessary for various types of processing performed by the controlling unit 15. The storage unit 14 includes a reference-image storage unit 14a, as a component closely related to the present invention.

The reference-image storage unit 14a stores therein reference images that are used in the character recognition process performed by the character recognizing unit 15d. For example, average character images that are created by use of a large number of images of existing fonts are stored as reference character images, as shown in FIG. 6.

The controlling unit 15 includes an internal memory to store controlling programs such as an operating system (OS), programs that specify the procedure of various processes, and other necessary data, and executes various processes based thereon. The controlling unit 15 includes, as components closely related to the present invention, a line detecting unit 15*a*, a character-region extracting unit 15*b*, a comparative image creating unit 15*c*, and a character recognizing unit 15*d*.

The line detecting unit 15*a* detects a line from the input document data. More specifically, upon receipt of the document data read by the reading unit 12, the line detecting unit 15*a* carries out black pixel histogram projection on the document data to detect the position of the line ($L_S$) and the width of the line ($H_L$) with reference to the peak of the black pixel count. The line detecting unit 15*a* also detects the height of the character string ($H_S$) with reference to the boundaries of the black pixel count (see FIGS. 2 and 3). The line detecting unit 15*a* outputs the detection results to the character-region extracting unit 15*b* and the comparative image creating unit 15*c*.

The character-region extracting unit 15*b* estimates the character region from the line-touching character-string image, and extracts the line-touching character image. More specifically, when the document data includes a line-touching character-string image in which characters (such as numbers, alphabet letters, kana characters, and Chinese characters), touch (or overlap) a line in the document data, the character-region extracting unit 15*b* tentatively removes the line from the line-touching character-string image based on the position and width of the line received from the line detecting unit 15*a*. Then, in the line-touching character-string image where the character string has been individually divided, the character-region extracting unit 15*b* estimates the character region based on the height of the character string received from the line detecting unit 15*a*. After the estimation of the character region, the character-region extracting unit 15*b* extracts the line-touching character image from the input line-touching character-string image (original image) based on the estimated character region. The character-region extracting unit 15*b* outputs the extracted line-touching character image to the character recognizing unit 15*d*.

As shown in FIG. 4, when the line-touching character-string image does not have a uniform height (see (1) of FIG. 4), the line detecting unit 15*a* can divide the line-touching character-string image into partial character string units, and then detect a line through the black pixel histogram (see (2) of FIG. 4). In this case, the character-region extracting unit 15*b* tentatively removes the line based on the detection result (see (3) of FIG. 4), and then estimates and extracts the character region. This is because the black pixel histogram does not exhibit a clear peak when the height of the character string is not uniform.

The comparative image creating unit 15*c* creates a line-added reference character image that is to be used in recognition of a character image. More specifically, the comparative image creating unit 15*c* creates a line-added reference character image by adding a quasi-line to a reference image that is stored in advance based on the position and width of the line received from the line detecting unit 15*a*. Then, the comparative image creating unit 15*c* outputs the created line-added reference character image to the character recognizing unit 15*d*.

The character recognizing unit 15*d* recognizes characters included in the line-touching character image by extracting pixel features from the line-touching character image received from the character-region extracting unit 15*b*, and also from the line-added reference character image received from the comparative image creating unit 15*c*, and comparing these pixel features with one another. More specifically, the character recognizing unit 15*d* compares the density pattern of pixels included in the line-touching character image with the density pattern of pixels included in the line-added reference character image. For example, when a predetermined degree of collation is found, the character included in the line-touching character image is recognized as the character (e.g., a number "5") included in the created line-added reference character image (a line-added reference character image in which the number "5" and a line are combined). Thereafter, the character recognizing unit 15*d* outputs the character recognition result to the output unit 13, where the result is displayed.

Figure 8:
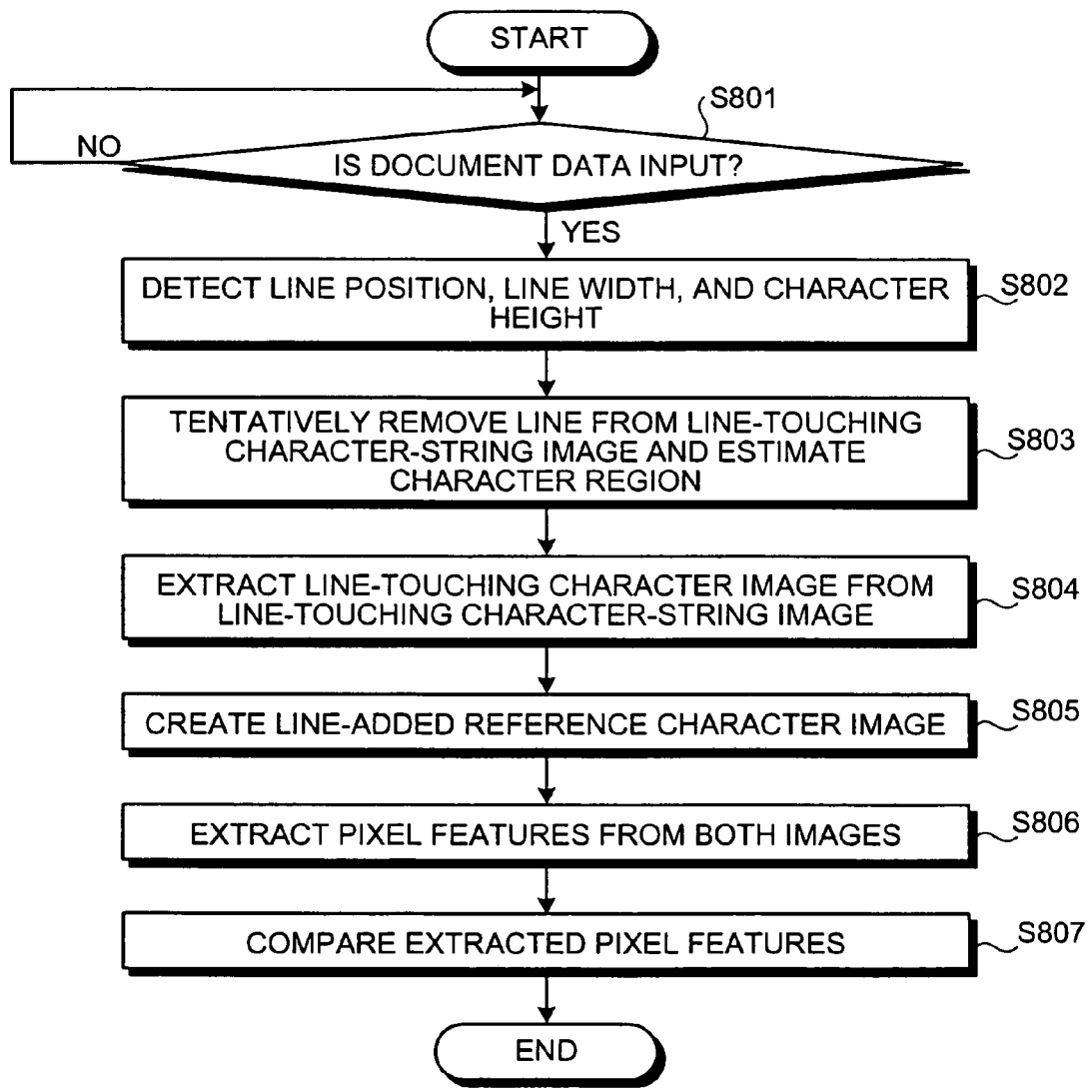
FIG. 8 is a flowchart of the operation of the character recognition device.

FIG. 8 is a flowchart of the operation of the character recognition device 10.

Once document data containing a character string (such as numbers, alphabet letters, kana characters, and Chinese characters) is input (Yes at step S801), the reading unit 12 reads the document data. Upon receiving the document data, the line detecting unit 15*a* projects the black pixel histogram onto the document data. Based on the peak of the black pixel count, the line detecting unit 15*a* detects the position of the line ($L_S$) and the width of the line ($H_L$) The line detecting unit 15*a* also detects the height of the character string ($H_S$) from the edges of the black pixel count (step S802, see FIGS. 2 and 3). Then, the line detecting unit 15*a* outputs the detection results respectively to the character-region extracting unit 15*b* and the comparative image creating unit 15*c*.

The character-region extracting unit 15*b* estimates the character region in the line-touching character-string image (step S803). More specifically, if the document data includes a line-touching character-string image in which characters (such as numbers, alphabet letters, kana characters, and Chinese characters) touch (or overlap) a line therein, the character-region extracting unit 15*b* tentatively removes the line from the line-touching character-string image based on the position and width of the line received from the line detecting unit 15*a*. Thereafter, the character-region extracting unit 15*b* applies the height of the character string that is received from the line detecting unit 15*a*, to the line-touching character-string image that is separated into individual characters to estimate the position of the character region.

The character-region extracting unit 15*b* then extracts the line-touching character image from the line-touching character-string image (step S804). More specifically, the character-region extracting unit 15*b* extracts the line-touching character image from the input line-touching character-string image (original image) based on the estimated character region. The character-region extracting unit 15*b* then outputs the extracted line-touching character image to the character recognizing unit 15*d*.

The comparative image creating unit 15*c* creates a line-added reference character image that is to be used for character image recognition (step S805). More specifically, the comparative image creating unit 15*c* creates a line-added reference character image by adding a quasi-line to a stored reference image, based on the position and width of the line received from the line detecting unit 15*a*. Then, the comparative image creating unit 15*c* outputs the created line-added reference character image to the character recognizing unit 15*d*.

The character recognizing unit 15*d* extracts pixel features from the line-touching character image received from the character-region extracting unit 15*b* and also from the line-added reference character image received from the comparative image creating unit 15*c* (step S806). Next, the character recognizing unit 15*d* compares the density pattern of pixels of the line-touching character image with the density pattern of pixels of the line-added reference character image (step S807).

When, for example, a predetermined degree of collation is found, the character recognizing unit 15*d* recognizes that the line-touching character image indicates a character (e.g., a number "5") included in the created line-added reference character image (a line-added reference character image in which the number "5" and a line are combined).

As described above, according to the first embodiment, when a character string that includes an overlapping character overlapped with a line is input from outside, the position and width of the line, and the height of the character string are estimated for an image of the overlapping character. The line is removed from the overlapping character image based on the estimated position and width of the line. After a character region is specified, based on the height of the character string, a region corresponding to the specified character region is extracted from the overlapping character image before the line removal as a target region. A reference image to be compared with the overlapping character image is created by adding a line image to character image stored in advance based on the estimated position and width of the line. The features of the target region are compared with the features of the reference image (e.g., comparison of pixel features and directional features extracted from the target region and the reference image). The overlapping character can thereby be recognized. Each time a character string is input from outside, the reference features of an overlapping character are dynamically generated. Thus, the overlapping character can be accurately recognized without securing a large memory capacity for a dictionary to store features of various overlapping characters in consideration of various pattern-character crossing positions.

Moreover, the pixel features of the target region indicating an arrangement of gray levels of pixels in the target region is compared with the pixel features of the created reference image indicating an arrangement of gray levels of pixels in the reference image. Hence, the overlapping character can be readily recognized from the arrangement of the pixels.

The present invention is not limited to the first embodiment described above, but it also encompasses many other embodiments. The following discussion focuses on other embodiments of the present invention.

(1) Character Recognition Based on Comparison of Directional Features

According to the first embodiment, characters included in a line-touching character image are recognized by comparing the pixel features extracted from the line-touching character image and from a line-added reference character image. The present invention, however, is not limited thereto. Characters included in the line-touching character image can be recognized by comparing directional features extracted from the line-touching character image and the line-added reference character image.

Figure 9:
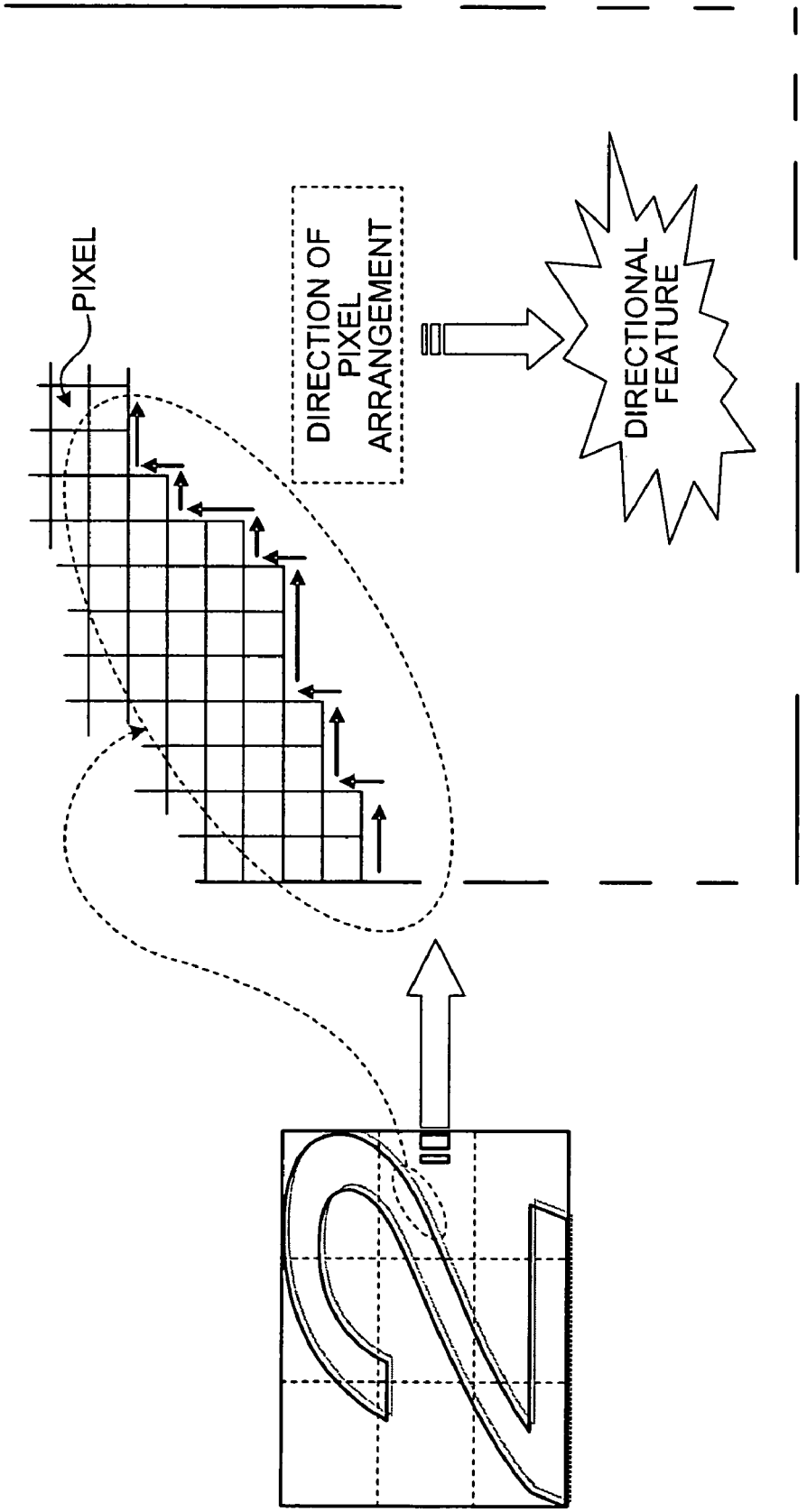
FIG. 9 is a schematic for explaining the concept of directional features according to a second embodiment of the present invention.

More specifically, as shown in FIG. 9, directional features that indicate the direction of the arrangement of pixels (gray levels) included in the reference character image are created and stored in the storage unit 14 in advance. The comparative image creating unit 15*c* combines the directional features stored in the storage unit 14 and the directional features of the line to create the directional features of the line-added reference character image. By comparing the generated directional features with the directional features extracted from the line-touching character image, the character recognizing unit 15*d* recognizes characters included in the line-touching character image.

In this manner, directions in which pixels with respective gray levels in the character image stored in advance are vertically and horizontally arranged, and a direction in which pixels with respective gray levels are horizontally arranged in the line are horizontally arranged are combined to generate directional features, i.e., the features of the arrangement direction of pixels with respective gray levels in the reference image. Characters included in the line-touching character image are recognized by comparing the directional features of the target region extracted from the line-unremoved overlapping character image with the directional features of the reference image. Hence, characters included in the overlapping character image can be recognized with higher accuracy than in character recognition using pixel features in which recognition results are more likely to be influenced by pixel arrangement even when the same characters are being dealt with.

(2) Extraction and Recognition of Character Region Including Characters Touching (or Overlapping) Each Other Furthermore, according to the first embodiment, a recognition target region is extracted from a line-touching character-string image from which the line is tentatively removed depending on an estimated character region. However, the present invention is not limited thereto. After the tentative removal of the line, the character image in which characters touch (or overlap) one another can be extracted as a single character region.

Figure 10:
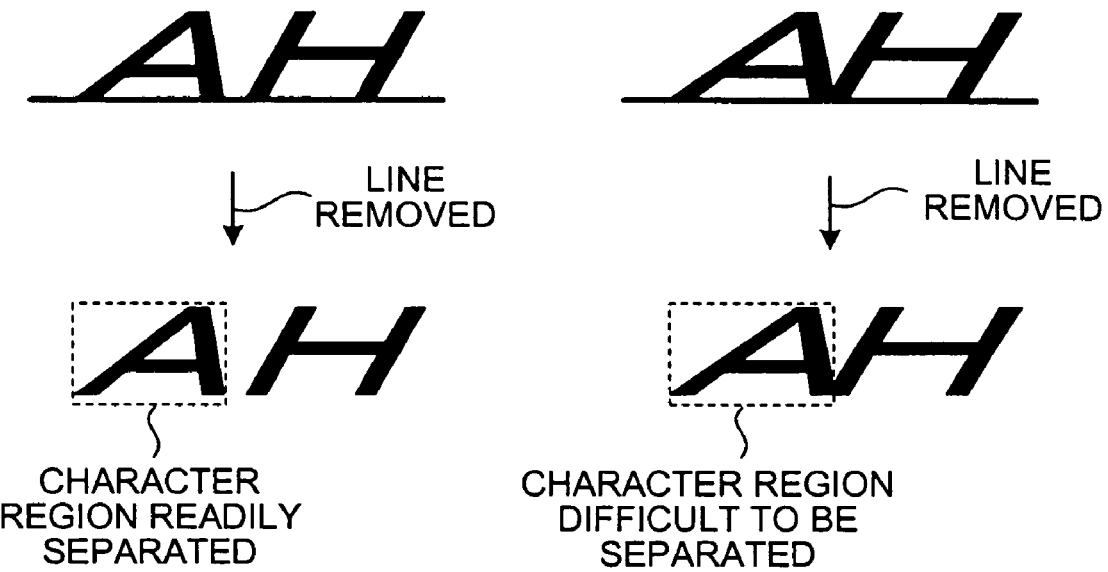
FIG. 10 is examples of character strings according to the second embodiment.

For example, as shown in FIG. 10, character images touch each other, and it is still difficult to estimate character regions after the removal of line. This means that a target region is difficult to extract (i.e., cut out). In such a case, the line-touching character image from which the line is removed is divided into predetermined regions according to several different division patterns. The divided regions are each subjected to tentative recognition. If the recognition reliability for a region reaches a predetermined level, the division pattern with the highest reliability is selected. The recognition target region is extracted depending on the selected pattern. On the other hand, if the recognition reliability is below the predetermined level as a result of tentative recognition, the line-touching character image after the line removal is determined as a single character region, and a target region is extracted from the line-touching character image before the line removal based on the character region determined as a single region.

When the target region is extracted based on the character region determined as a single region, a line image is added to each of combined character images that are created by combining some of stored character images. Reference images are thereby created, and recognition is performed based on the reference images.

When a character region of a single character cannot be specified in the overlapping character image after the line removal, the line-removed overlapping character image is divided into regions according to several different division patterns. Then, tentative character recognition is conducted on each of the regions. If the tentative character recognition achieves a predetermined level of reliability, a division pattern with the highest reliability is selected, and a target region is extracted from the line-unremoved overlapping character image based on the selected division pattern. On the other hand, if the tentative character recognition achieves the predetermined level of reliability in none of the regions, the line-removed overlapping character image is determined as a single character region, and a target region is extracted from the line-unremoved overlapping character image based on the region determined as the single character region. In this case, a reference image is created by adding a line image to each of combinations of character images stored in advance. Hence, even when the character region cannot be specified because characters of an input character string overlap one another after the line is removed therefrom, a region that would include characters with a high probability can be determined and extracted from the overlapping character image. When the region that would include characters with a high probability cannot be determined, a reference image is created to conduct character recognition on a target region corresponding to the line-removed overlapping character image. As a result, characters included in the overlapping character image can be recognized with a high accuracy.

(3) Conversion of Broken Line to Solid Line

Figure 11:
FIG. 11 is an example of a line-added reference character image according to the second embodiment.

In the situation where the line is a broken line in the first embodiment, the line position, the character string height, and the line width of the line-touching character-string image can be estimated, for example, after the broken line is converted to a solid line as shown in FIG. 11.

As described above, when the line in the overlapping character image is a broken line, the broken line is converted to a solid line to estimate the line position, the character string height, and the line width of the line-touching character-string image in which the broken line has been converted to the solid line. Thus, it is not necessary to detect a broken line, which is difficult to detect. Further, because the broken line is converted to the solid line, it is not necessary to specify where the blanks of the broken line are at the time of creating a reference image. As a result, the overlapping character image can be efficiently recognized.

(4) Creation of Reference Image Based on Character Font Determined Based on Recognition Result The font of an input character string can be estimated based on the recognition result of the line-touching character image that is obtained according to the first embodiment. Then, a reference image can be created to be compared with the line-touching character image by adding a line image to a character image that is selected, based on the estimated font, from stored character images for different fonts.

Thus, the font of the characters estimated during the process of recognizing the overlapping character image can be used to recognize the rest of the characters of the character image. This enables the characters of the overlapping character image to be recognized with high accuracy without being adversely influenced by any peculiar font.

(5) Recognition of Stamp-Overlapping Character Image

Figure 12:
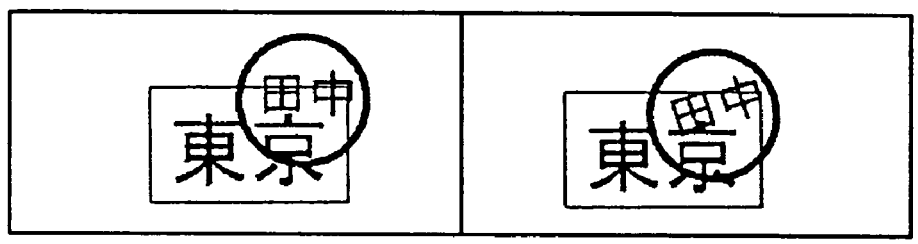
FIG. 12 is examples of character strings overlapped with a stamp according to the second embodiment.

According to the first embodiment, character recognition is conducted on a character image in which a line runs across a character. The present invention, however, is not limited thereto. For example, as shown in FIG. 12, character recognition can be applied to a character image in which a stamp and a character overlap one another (hereinafter, "stamp-overlapping character image").

Figure 13:
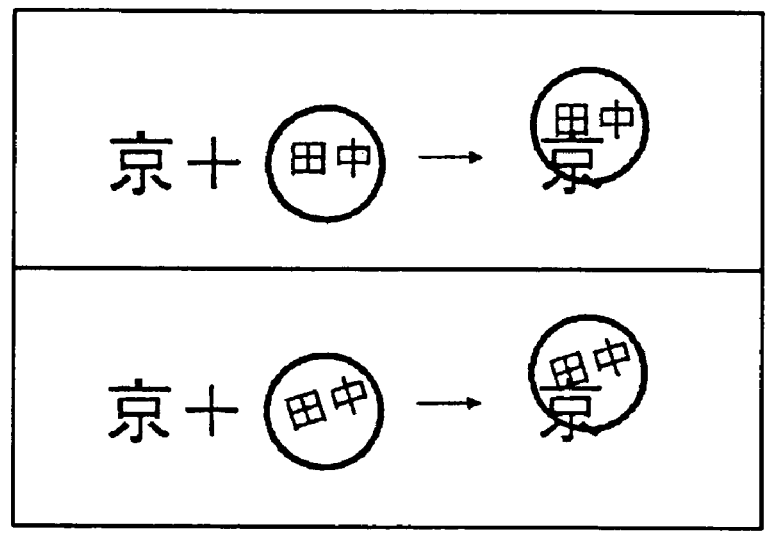
FIG. 13 is examples of characters overlapped with the stamp shown in FIG. 12.

More specifically, the position of the stamp in the stamp-overlapping character image is estimated, and the stamp is removed from the stamp-overlapping character image based on the estimated stamp position. The character region is specified in the stamp-overlapping character image from which the stamp is removed. Then, a region corresponding to the specified character region is extracted from the stamp-unremoved stamp-overlapping character image as the target region. A reference image to be compared with the stamp-overlapping character image is created by adding a stamp image to a stored character image based on the estimated stamp position (see FIG. 13, for example). The image features of the target region extracted from the stamp-unremoved stamp-overlapping character image are compared with the image features of the created reference image. Characters included in the stamp-overlapping character image are thereby recognized.

Thus, the image features of the target region extracted from the stamp-unremoved stamp-overlapping character image (e.g., the pixel features or directional features of the stamp outline and the characters therein) are compared with the image feature of the created reference image (e.g., the pixel features or directional features). Every time a stamp-overlapping character is input from outside, the reference features of the stamp-overlapping character are dynamically generated. Consequently, the stamp-overlapping character can be accurately recognized without securing a large memory capacity for a dictionary to store features of various stamp-overlapping characters.

When a stamp-overlapping character is to be recognized, several reference images to be compared with the stamp-overlapping character image can be created by adding, to each character image stored in advance, stamp images in different angles, densities, and colors. Then, the image features of the target region extracted from the stamp-unremoved stamp-overlapping character image can be compared with the image features of the reference images to recognize the stamp-overlapping character.

In this manner, a plurality of features of possible pattern-overlapping characters can be taken into consideration. This increases the accuracy in recognizing the pattern-overlapping characters.

(6) Structure of Device and Others

The structural components of the character recognition device 10 shown in FIG. 7 are functionally conceptual, and need not necessarily be physically configured as illustrated. In other words, the specific mode of arrangement of the character recognition device 10 is not limited to that shown in the drawing, and can be functionally or physically separated or integrated, partly or wholly, according to the load or usage. For example, the line detecting unit 15a and the character-region extracting unit 15b can be integrated. In addition, all or an arbitrary part of the processing functions of the character recognition device 10 (including the line detection function, the character region extraction function, the comparative image creation function, and the character recognition function; see FIG. 8) can be realized by a central processing unit (CPU) or a computer program analyzed and executed by the CPU. The processing functions can also be implemented in wired-logic hardware.

(7) Character Recognition Program

Figure 14:
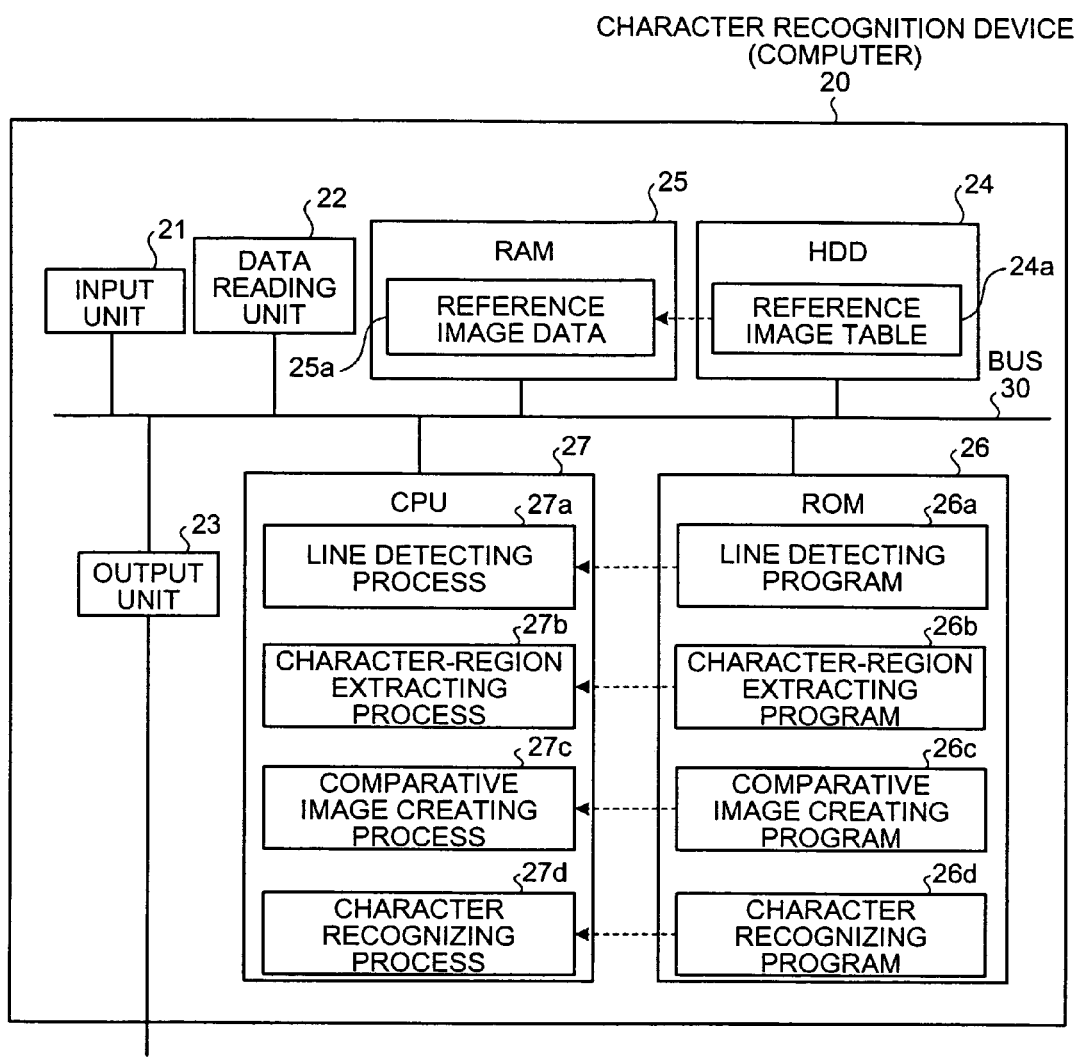
FIG. 14 is a block diagram of a computer that executes a character recognition program.

The process performed by the character recognition device 10 (see FIG. 8) can be can be implemented as software. In other words, a computer program (hereinafter, "a character recognition program") can be executed on a computer, such as a personal computer and a work station, to realize the same function as the character recognition device 10. In the following, such a computer is explained with reference to FIG. 14. FIG. 14 is a block diagram of a computer 20 that executes the character recognition program.

The computer 20, as a character recognition device, includes an input unit 21, a reading unit 22, an output unit 23, a hard disk drive (HDD) 24, a random access memory (RAM) 25, a read only memory (ROM) 26, and a CPU 27, all connected by way of a bus 30. The input unit 21, the reading unit 22, and the output unit 23 correspond to the input unit 11, the reading unit 12, and the output unit 13 shown in FIG. 7.

The ROM 26 stores therein the character recognition program including a line detecting program 26a, a character-region extracting program 26b, a comparative image creating program 26c, and a character recognizing program 26d, as indicated in FIG. 14. These programs 26a, 26b, 26c, and 26d can be suitably separated or integrated, in a similar manner as the structural components of the character recognition device 10 shown in FIG. 7. A non-volatile RAM can be adopted in place of the ROM 26.

When the CPU 27 reads programs 26a, 26b, 26c, and 26d from the ROM 26 and executes them, the programs 26a, 26b, 26c, and 26d function as a line detecting process 27a, a character-region extracting process 27b, a comparative image creating process 27c, and a character recognizing process 27d, respectively, as shown in FIG. 14. The processes 27a, 27b, 27c, and 27d correspond to the line detecting unit 15a, the character-region extracting unit 15b, the comparative image creating unit 15c, and the character recognizing unit 15d, respectively, as shown in FIG. 7.

The HDD 24 stores therein a reference image table 24a as shown in FIG. 14. This reference-image table 24a corresponds to the reference-image storage unit 14a shown in FIG. 7. The CPU 27 reads reference image data 25a from the reference image table 24a, stores it in the RAM 25, and executes the character recognition process based on the reference image data 25a.

The programs 26a, 26b, 26c, and 26d are not necessarily stored in the ROM 26 in advance. For example, the programs can be stored in a portable physical medium that is to be inserted into the computer 20 such as a flexible disk (FD), a compact disc-read only memory (CD-ROM), a digital versatile disk (DVD), a magneto-optical disk, and an integrated circuit (IC) card, or in a fixed physical medium such as an HDD inside the computer 20 or outside it. The computer 20 can execute the programs by reading them from the medium. The programs can also be downloaded from another computer (or a server) connected to the computer 20 via a public line, the Internet, a local area network (LAN), a wide area network (WAN), or the like.

As set forth hereinabove, according to the embodiments of the present invention, when a character string that includes an overlapping character (e.g., a character overlaps a line in a document, or a stamp overlaps a character) is input from outside, features of a pattern stored in advance (e.g., pixel features and directional features of the line and an outline of the stamp) and features of the character (pixel features and directional features of the character taking the font and style into account) are combined to obtain reference features of the overlapping character (pixel features and directional features of a combination of a line and a number in a document). Then, the reference features are compared with the features of the overlapping character to recognize the overlapping character. Each time a character string is input from outside, the reference features of an overlapping character are dynamically generated. Thus, the overlapping character can be accurately recognized without securing a large memory capacity for a dictionary to store features of various overlapping characters in consideration of various pattern-character crossing positions.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for recognizing an overlapping character which is overlapped with a pattern, the computer program causing the computer to execute:
   estimating, when a character string that includes an overlapping character is input from outside, a position of a pattern in an image of the overlapping character;
   removing the pattern from the overlapping character image based on estimated position of the pattern;
   specifying a character region in the overlapping character image from which the pattern has been removed;
   extracting a region corresponding to specified character region from the overlapping character image before removal of the pattern as a target region to be subjected to character recognition;
   creating a reference image to be compared with the overlapping character image by adding an image of the pattern to a character image stored in advance based on the estimated position; and
   recognizing the overlapping character by comparing a feature of an image in the target region with a feature of the reference image.

2. The computer-readable recording medium according to claim 1, wherein
   the estimating includes estimating, when the pattern is a line, a position and a width of the line, and a height of the character string;
   the removing includes removing the line from the overlapping character image based on estimated position and width of the line;
   the specifying includes specifying the character region based on estimated height of the character string; and
   the creating includes creating the reference image by adding an image of the line to the character image based on the estimated position and width of the line.

3. The computer-readable recording medium according to claim 2, wherein the computer program further causing the computer to execute:
   dividing, when a character region of a single character cannot be specified, the overlapping character image from which the line has been removed into regions according to a plurality of division patterns to perform provisional character recognition on each of the regions; and
   selecting, when the provisional character recognition achieves a predetermined level of reliability, a division pattern with highest reliability from among the division patterns, wherein
   the specifying includes specifying, when the provisional character recognition achieves the predetermined level of reliability in none of the regions, the overlapping character image from which the line has been removed as a block-character region;
   the extracting includes extracting the target region based on selected division pattern, and extracting a region corresponding to the block-character region from the overlapping character image before removal of the pattern as the target region; and
   the creating includes creating the reference image, when the region corresponding to the block-character region is extracted as the target region, by adding the line image to a combination of a plurality of character images stored in advance.

4. The computer-readable recording medium according to claim 2, wherein the computer program further causing the computer to execute converting, when the line is a broken line, the broken line to a solid line, and
   the estimating includes estimating a position and a width of the solid line, and a height of the character string after conversion of the broken line to the solid line.

5. The computer-readable recording medium according to claim 2, wherein the feature of the image in the target region is an arrangement of pixels in the image, and the feature of the reference image is an arrangement of pixels in the reference image.

6. The computer-readable recording medium according to claim 2, wherein
   the creating includes creating a directional feature of the reference image based on a combination of directions in which pixels in the character image stored in advance are vertically and horizontally arranged and a direction in which pixels in the line image are horizontally arranged, the directional feature being a feature of directions in which pixels in the reference image are arranged; and
   the recognizing includes recognizing the overlapping character by comparing a directional feature of the target region with the directional feature of the reference image.

7. The computer-readable recording medium according to claim 2, wherein the computer program further causing the computer to execute estimating a font of the character string; and
   the creating includes creating the reference image by adding the line image to a character image selected, based on estimated font, from character images stored in advance with respect to each font.

8. The computer-readable recording medium according to claim 1, wherein the estimating includes estimating, when the pattern is a stamp, a position of the stamp.

9. The computer-readable recording medium according to claim 8, wherein:
   the creating includes creating a plurality of reference images by adding images of the stamp in different angles, different densities, and different colors to the character image based on estimated position of the stamp; and
   the recognizing includes recognizing the overlapping character by comparing the feature of the image in the target region with a feature of each of the reference images.

10. A character recognition method for recognizing an overlapping character which is overlapped with a pattern, the character recognition method comprising:
    estimating, when a character string that includes an overlapping character is input from outside, a position of a pattern in an image of the overlapping character;
    removing the pattern from the overlapping character image based on estimated position of the pattern;
    specifying a character region in the overlapping character image from which the pattern has been removed;
    extracting, using a processor, a region corresponding to specified character region from the overlapping character image before removal of the pattern as a target region to be subjected to character recognition;
    creating, using the processor, a reference image to be compared with the overlapping character image by adding an image of the pattern to a character image stored in advance based on the estimated position; and
    recognizing the overlapping character by comparing a feature of an image in the target region with a feature of the reference image.

11. The character recognition method according to claim 10, wherein
    the estimating includes estimating, when the pattern is a line, a position and a width of the line, and a height of the character string;
    the removing includes removing the line from the overlapping character image based on estimated position and width of the line;
    the specifying includes specifying the character region based on estimated height of the character string; and
    the creating includes creating the reference image by adding an image of the line to the character image based on the estimated position and width of the line.

12. The character recognition method according to claim 10, wherein the pattern is a stamp.

13. A character recognition device that recognizes an overlapping character which is overlapped with a pattern, the character recognition device comprising:
    a processor and a memory,
    wherein the processor includes
        an estimating unit that estimates, when a character string that includes an overlapping character is input from outside, a position of a pattern in an image of the overlapping character;
        an extracting unit that removes the pattern from the overlapping character image based on estimated position of the pattern, specifies a character region in the overlapping character image from which the pattern has been removed, and extracts a region corresponding to specified character region from the overlapping character image before removal of the pattern as a target region to be subjected to character recognition;
        a creating unit that creates a reference image to be compared with the overlapping character image by adding an image of the pattern to a character image stored in advance based on the estimated position; and
        a recognizing unit that recognizes the overlapping character by comparing a feature of an image in the target region with a feature of the reference image.

14. The character recognition device according to claim 13, wherein:
    the estimating unit estimates, when the pattern is a line, a position and a width of the line, and a height of the character string;
    the extracting unit removes the line from the overlapping character image based on estimated position and width of the line, and specifies the character region based on estimated height of the character string; and
    the creating unit creates the reference image by adding an image of the line to the character image based on the estimated position and width of the line.

15. The character recognition device according to claim 13, wherein the pattern is a stamp.

* * * * *